(12) United States Patent
Vossberg

(10) Patent No.: US 10,481,977 B2
(45) Date of Patent: Nov. 19, 2019

(54) DISPERSED STORAGE OF ERROR ENCODED DATA OBJECTS HAVING MULTIPLE RESOLUTIONS

(71) Applicant: International Business Machines Corporation, Armonk, NY (US)

(72) Inventor: Trevor J. Vossberg, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/335,838

(22) Filed: Oct. 27, 2016

(65) Prior Publication Data

US 2018/0121284 A1    May 3, 2018

(51) Int. Cl.
   *G01N 21/88* (2006.01)
   *G06F 11/10* (2006.01)

(52) U.S. Cl.
   CPC .................. *G06F 11/1076* (2013.01)

(58) Field of Classification Search
   CPC ............ G06F 11/1076; G06F 11/1008; G06F 11/106; H05K 999/99; G11C 2029/0411; G06T 7/0004; G06T 7/62; G06T 2207/10024; G06T 2207/10016; G06T 2207/30148; G06T 2207/10056; G01B 11/2441; G01B 11/24; G01B 11/12; G01B 11/25; G01B 11/02; G01B 2210/056; G01N 21/8851; G01N 21/9505; G01N 2021/8887; G02B 21/244; G02B 21/367
   USPC ........................................................ 714/764
   See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |

(Continued)

OTHER PUBLICATIONS

Shamir; How to Share a Secret; Communications of the ACM; vol. 22, No. 11; Nov. 1979; pp. 612-613.
(Continued)

*Primary Examiner* — Samir W Rizk
*Assistant Examiner* — Enam Ahmed
(74) *Attorney, Agent, or Firm* — Garlick & Markison; Timothy W. Markison; Patricia A. Markison

(57) ABSTRACT

A method includes determining a desired retrieval resolution of a data segment. A first sub-set of encoded data slices corresponds to a first resolution of the data segment, a second sub-set of encoded data slices corresponds to a second resolution, and a third sub-set of encoded data slices corresponds to redundancy encoded data slices. The method further includes, when the desired retrieval resolution is the first resolution, sending first requests to storage units regarding the first sub-set of encoded data slices, and dispersed storage error decoding the first sub-set of encoded data slices to recover the data segment at the first resolution. The method further includes, when the desired retrieval resolution is the second resolution, sending second requests to storage units regarding the second sub-set of encoded data slices, and dispersed storage error decoding the second sub-set of encoded data slices to recover the data segment at the second resolution.

16 Claims, 10 Drawing Sheets

(56) References Cited

U.S. PATENT DOCUMENTS

| | | | |
|---|---|---|---|
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 9,927,978 | B2 * | 3/2018 | Abhijeet ............ G06F 11/1076 |
| 9,934,092 | B2 * | 4/2018 | Ober ................ G06F 11/1076 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbell et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0213929 | A1 * | 9/2011 | Baptist ............ G06F 11/1076 711/114 |
| 2015/0355966 | A1 * | 12/2015 | Resch .............. G06F 11/0775 714/766 |
| 2016/0154698 | A1 * | 6/2016 | Kazi ................ G06F 11/1092 714/766 |
| 2016/0253240 | A1 * | 9/2016 | Cocagne ............ G06F 3/0619 714/764 |
| 2017/0153828 | A1 * | 6/2017 | Hegde .............. G06F 3/0635 |
| 2017/0249205 | A1 * | 8/2017 | Iljazi ................ G06F 3/064 |
| 2018/0024887 | A1 * | 1/2018 | Shirley, Jr. ......... H04L 67/1097 |
| 2019/0138393 | A1 * | 5/2019 | Grube .............. H03M 13/3761 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

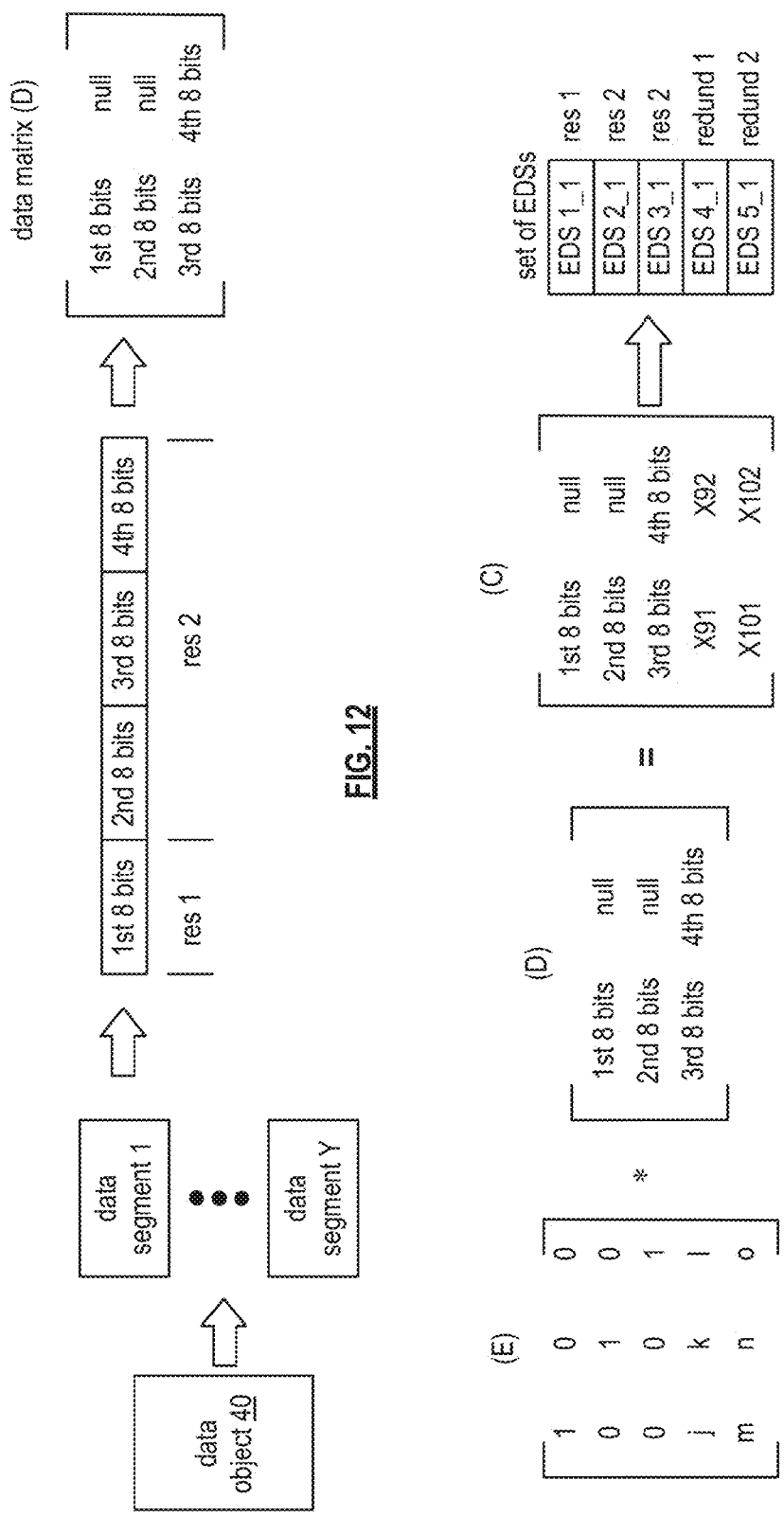

DISPERSED STORAGE OF ERROR ENCODED DATA OBJECTS HAVING MULTIPLE RESOLUTIONS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Cloud storage is often used to store video files for video on demand applications. Many video on demand application allow users to download a video file in one of many video resolution formats. For example, a user can download a movie in a standard definition format (e.g., 720i), a high definition (HD) format (e.g., 720p), an HDX format (e.g., 1080p), or a 4K HD format. In general, a higher resolution format includes more bits per pixel than a lower resolution format.

BRIEF DESCRIPTION OF THE SEVERAL VIEWS OF THE DRAWING(S)

FIG. 12 is an example of creating a resolution-based data matrix in accordance with the present invention FIG. 13 is an another example of dispersed error encoding a data object based on resolution in accordance with the present invention;

DETAILED DESCRIPTION OF THE INVENTION

Figure 1:
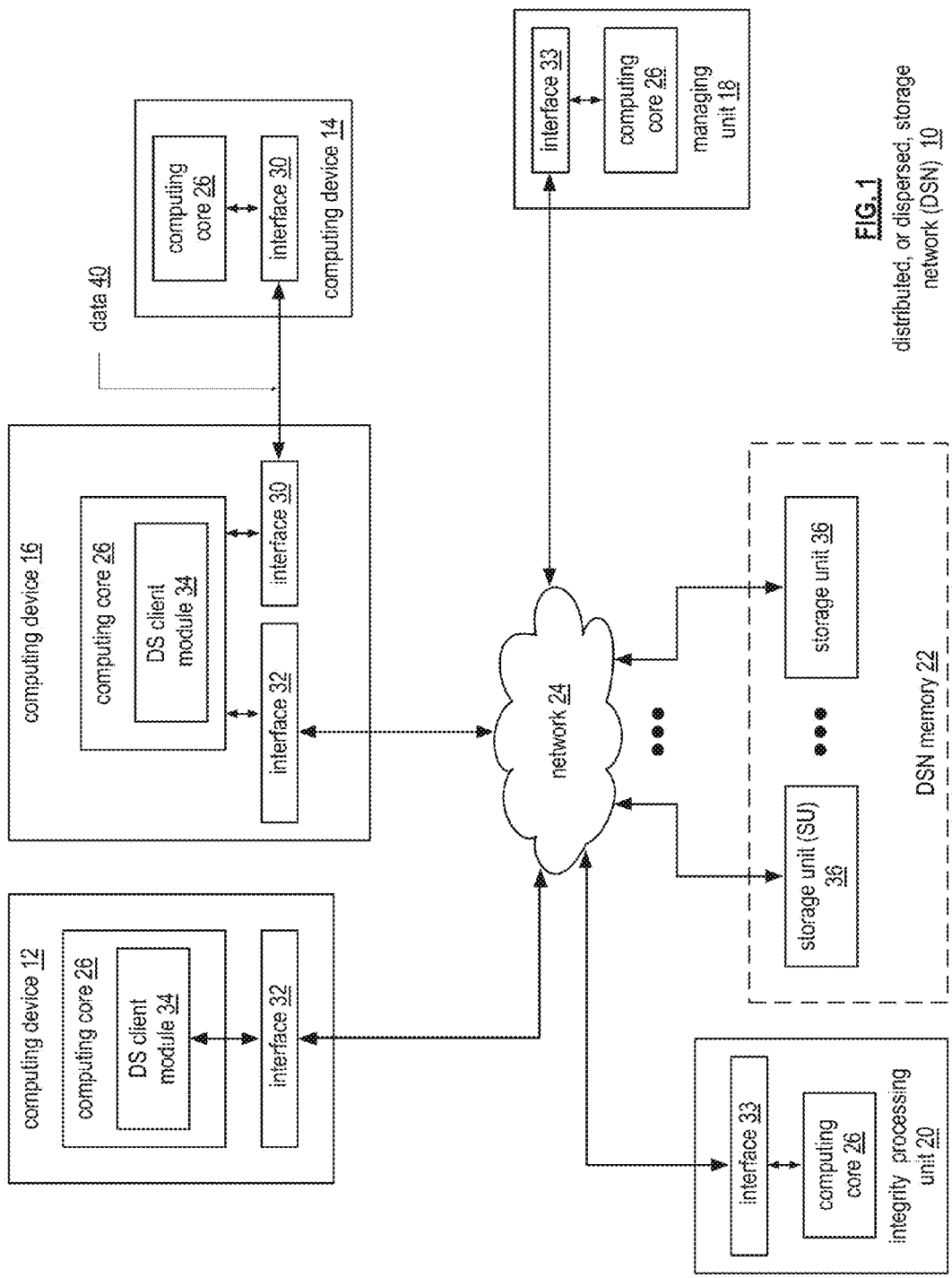
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
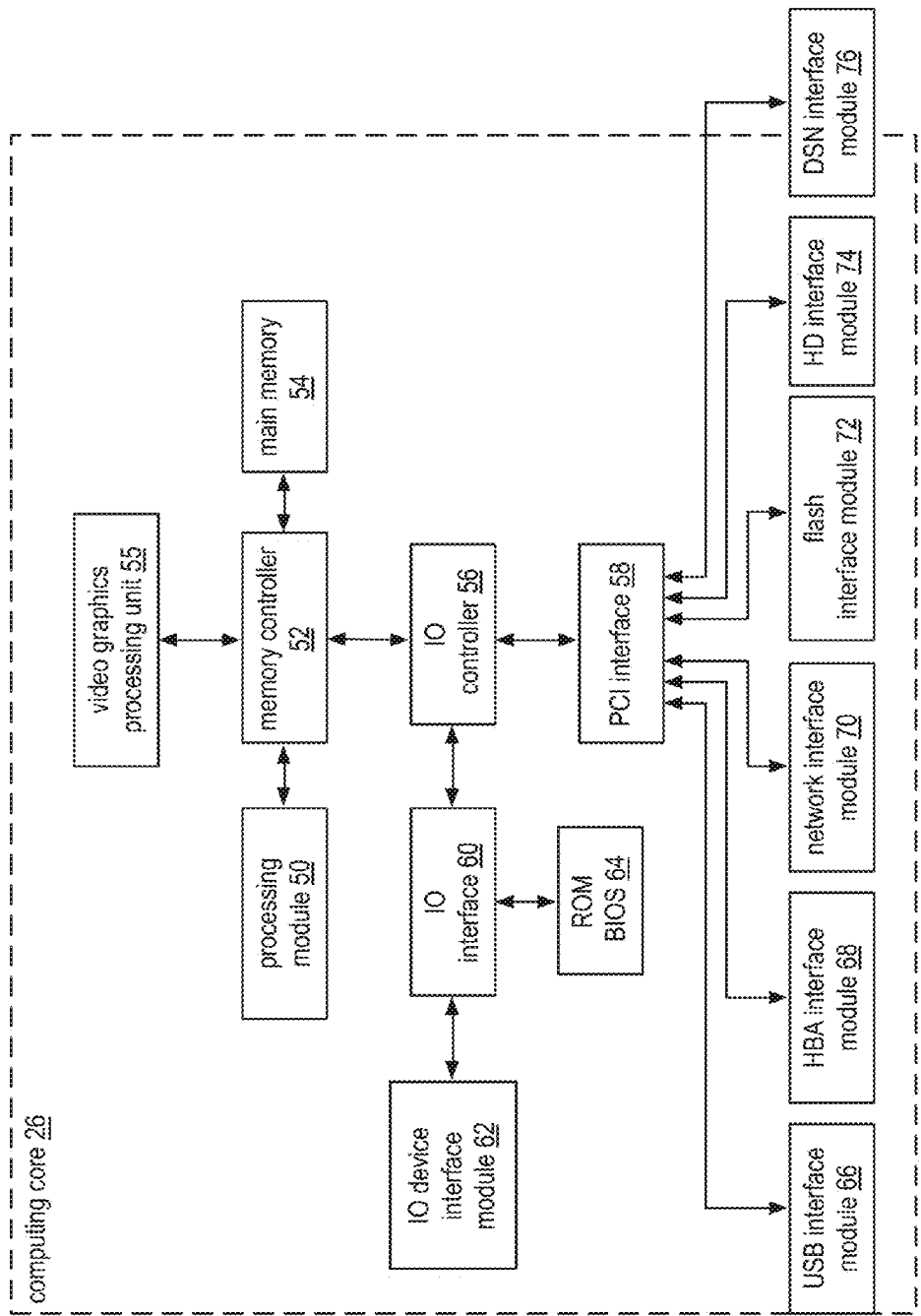
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (10) controller 56, a peripheral component interconnect (PCI) interface 58, an 10 interface module 60, at least one 10 device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
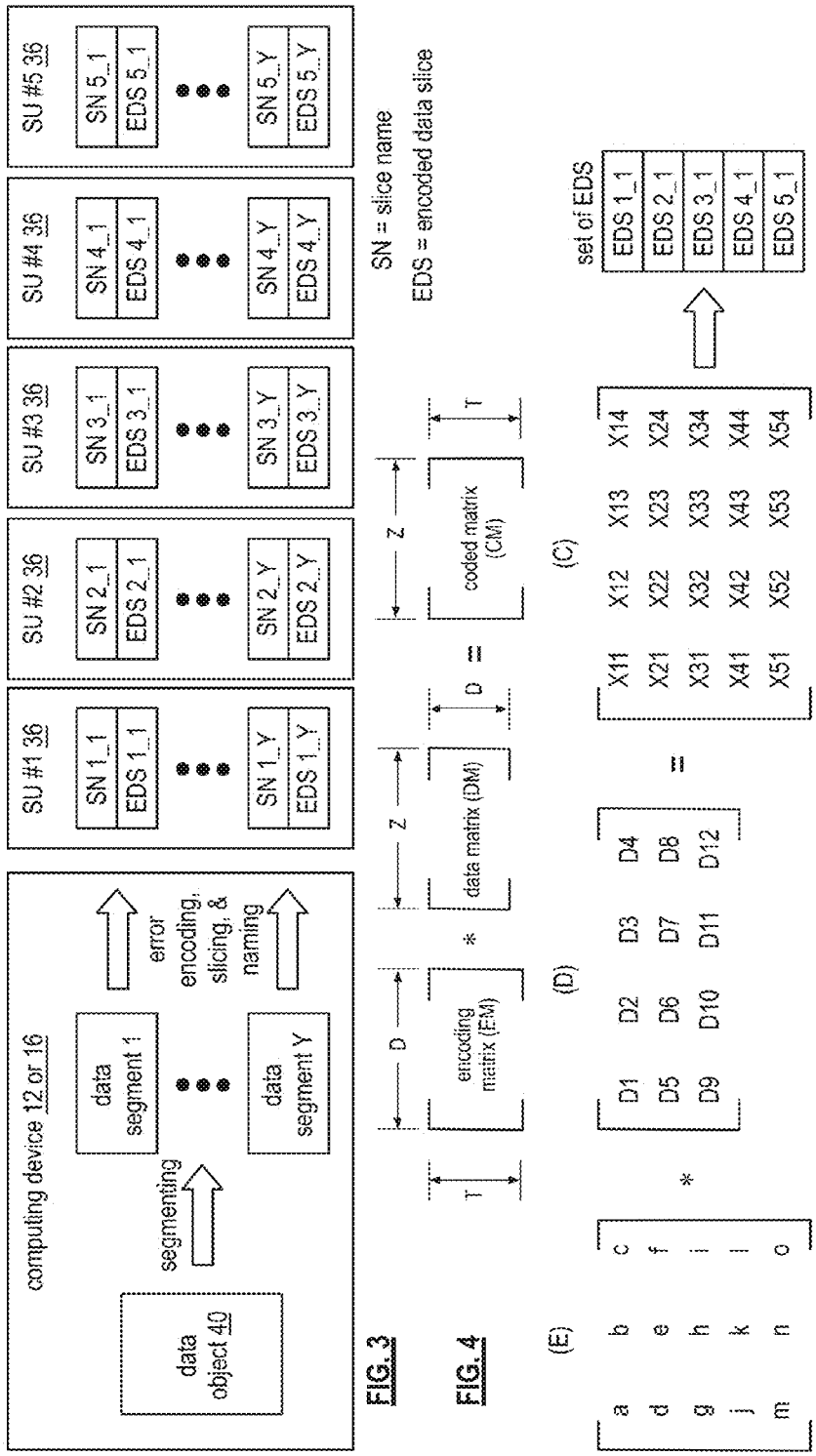
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
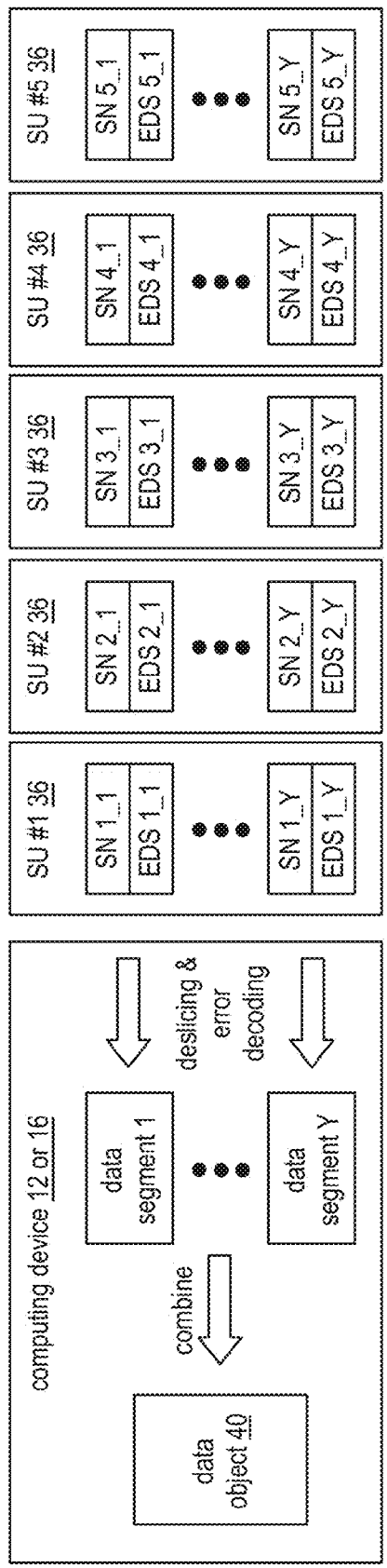
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
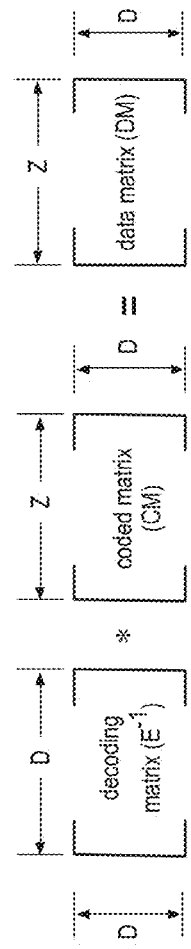
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
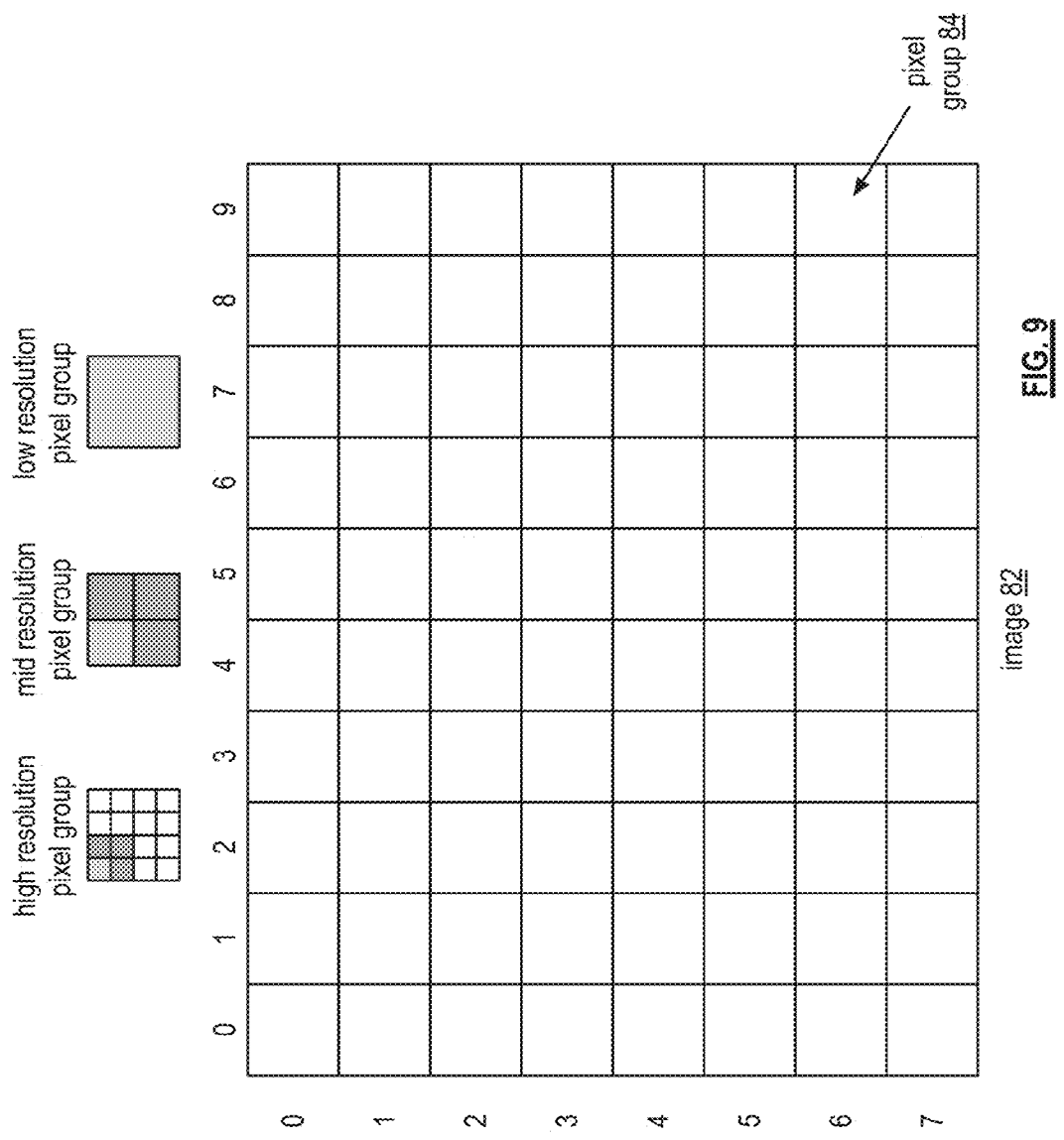
FIG. 9 is an example of data object resolution in accordance with the present invention.

FIG. 9 is an example of data object resolution. A data object may be a video, audio, or digital image file. Data objects may be represented at various levels of resolution. As a specific example, a digital image 82 may be represented as a collection of pixel groups 84. In this example, the image 82 contains 10×8 pixel groups 84. To enhance the resolution of image 82, a pixel group 84 may contain more pixels per area. For example, a low resolution image may contain one pixel per pixel group such that the image 82 has a resolution of 10×8 pixels. A mid-level resolution image may contain four pixels per pixel group such that the image 82 has an increased resolution of 20×16. Likewise, a higher resolution image may contain sixteen pixels per pixel group such that the image 82 has an increased resolution of 40×32. As another example, a pixel may be represented by an amount of bits. To enhance image resolution, a pixel can be represented by more bits per pixel. For example, a low resolution pixel may be represented as 8 bits, a mid-level resolution pixel may be represented as 32 bits, and a high resolution pixel may be represented as 128 bits.

Figure 10:
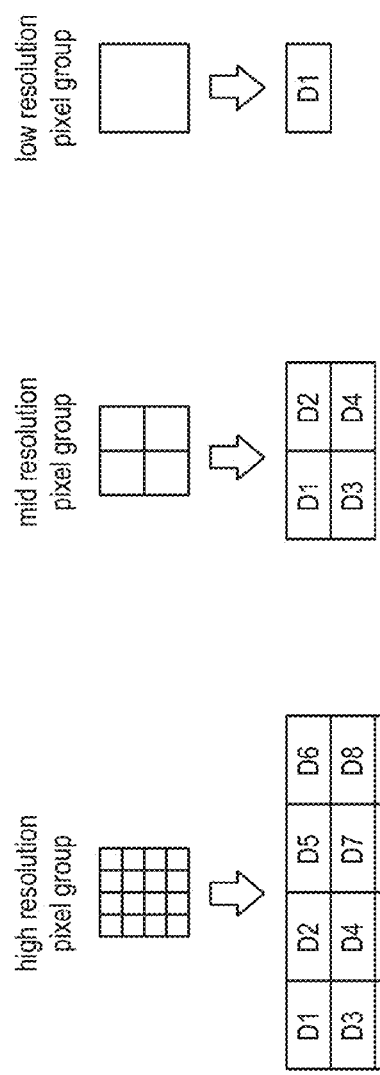
FIG. 10 is an example of dividing a data segment of a data object into data elements in accordance with the present invention.

FIG. 10 is an example of dividing a data segment of a data object into data elements. This example shows the low resolution pixel group containing one pixel, the mid-level resolution pixel group containing four pixels, and the high resolution pixel group containing sixteen pixels. Each pixel group is divided into data elements where each data element represents one pixel of the pixel group. For instance, the high resolution pixel group is divided into data elements D1-D16. While the example depicts dividing a pixel group of an image into data elements, a data segment of any data object (e.g., a video, audio, or digital image file) may be similarly divided into a plurality of data elements.

Figure 11:
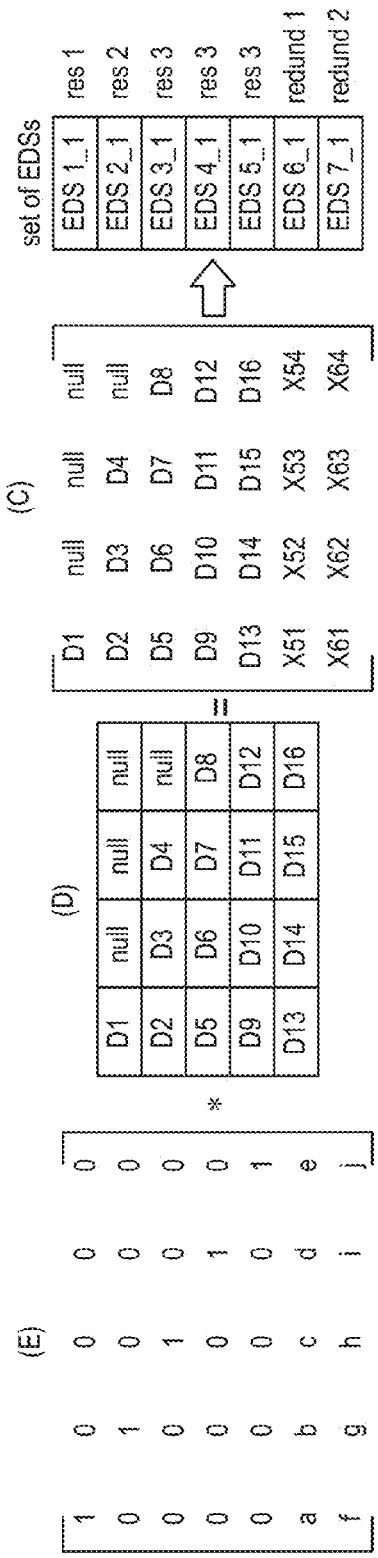
FIG. 11 is an example of dispersed error encoding a data object based on resolution in accordance with the present invention.

FIG. 11 is an example of dispersed error encoding a data object based on resolution. A data object (e.g., a video, audio, or digital image file) is divided into a plurality of data segments. For example, an image may be divided into pixel groups. The data segment is then divided into a plurality of data elements as discussed with reference to FIG. 10. The data elements are then arranged into a resolution-based data matrix. The data elements may be arranged into the data matrix such that a first one or more rows of data elements corresponds to the data segment at a first resolution and the first one or more rows and a second one or more rows corresponds to the data segment at a second resolution. The first resolution includes a first fidelity level, and the second resolution includes a second fidelity level such that the second fidelity level is greater than the first fidelity level. In addition, a third resolution includes a third fidelity level such that the third fidelity is greater than the second fidelity level.

As an example, the high resolution pixel group containing sixteen pixels is divided into data elements D1-D16 as shown in FIG. 10. The first row of the data matrix (shown in the FIG. 11 as matrix (D)) includes data element D1 which is the low resolution pixel group containing one pixel (i.e., the first resolution). The second row of the data matrix includes data elements D2, D3, and D4. Combining the first and second row of the data matrix corresponds to the mid-level resolution pixel group containing four pixels (i.e., the second resolution). The third, fourth, and fifth row of the data matrix include data elements D5-D16 such that combining all five rows of the data matrix corresponds to the high resolution pixel group containing sixteen pixels (e.g., the third resolution).

The data segment divided into data elements and organized into the data matrix is then dispersed error into a set of encoded data slices such that a first sub-set of encoded data slices of the set of encoded data slices corresponds to the first resolution of the data segment, a second sub-set of encoded data slices of the set of encoded data slices corresponds to the second resolution of the data segment, and the third sub-set of encoded data slices of the set of encoded data slices corresponds to redundancy encoded data slices. In addition, a fourth sub-set of encoded data slices of the set of encoded data slices corresponds to the third resolution of the data segment.

The data segment is dispersed error encoded by matrix multiplying the data matrix with an encoding matrix (matrix (E)) to produce a coded matrix (matrix (C)). The first sub-set of encoded data slices is selected from a first one or more rows of the coded matrix, and the second sub-set of encoded data slices is selected to include the first one or more rows of the coded matrix and a second one or more rows of the coded matrix. For example, EDS 1_1 is selected from the first row of the coded matrix containing data element D1 and corresponds to the first resolution of the data segment. EDS 2_1 is selected from the second row of the coded matrix containing data elements D2-D4 and EDS 1_1 and EDS 2_1 corresponds to the second resolution of the data segment. EDS 3_1, EDS 4_1, and EDS 5_1 are selected from the third, fourth, and fifth rows respectively containing data elements D5-D16 and EDS 1_1 through EDS 5_1 correspond to a third resolution of the data segment. EDS 6_1 and EDS 7_1 are selected from rows 6 and 7 of the coded matrix and correspond to redundancy data X51-X64.

As another example, an image file may be stored as a bitmap. The bitmap image may be interlaced and divided into data elements representing pixels located at coordinates (a+4k, b+4j) where k and j are integers, a and b are numbers 1 through 3, and each data element has a unique a and b combination (if a threshold of 16 slices is selected in order to recover the full image). The data elements would be arranged in the data matrix such that retrieving a first encoded data slice stored based on this encoding scheme would yield a thumbnail 1/16 the size of the full image. As more encoded data slices are retrieved, more of the full image may be retrieved.

In a retrieval operation, when a computing device of the DSN determines the desired retrieval resolution of a data segment of data object is the first resolution, the computing device sends one or more first requests to one or more storage units of the DSN regarding the first sub-set of encoded data slices (e.g., EDS 1_1). Once the desired encoded data slices are retrieved, the computing device dispersed storage error decodes the first sub-set of encoded data slices to recover the data segment at the first resolution. For example, a low resolution representation of the data segment may be obtained by retrieving and decoding EDS 1_1. When the desired retrieval resolution is the second resolution, the computing device will send one or more second requests to storage units of the DSN regarding the second sub-set of encoded data slices (e.g., EDS 1_1 and EDS 2_1). The computing device will then dispersed storage error decode the second sub-set of encoded data slices to recover the data segment at the second resolution. If a computing device of the DSN requests retrieval of the data object at a higher resolution, more slices may be retrieved to enhance the image. For example, if the desired retrieval resolution is a third resolution, where a fourth sub-set of encoded data slices of the set of encoded data slices corresponds to the third resolution of the data segment (e.g., EDS 1_1, EDS 2_1, EDS 3_1, EDS 4_1, and EDS 5_1), the computing device will send third requests to the storage units of the DSN regarding the fourth sub-set of encoded data slices. The computing device will then dispersed storage error decode the fourth sub-set of encoded data slices to recover the data segment at the third resolution.

Dispersed error encoding the data object produces redundant data (e.g., EDS 6_1 and EDS 7_1) so that desired encoded data slices may be reconstructed if lost or damaged.

For example, when a computing device of the DSN sends a read request to a storage unit of one or more storage units of the DSN for a first encoded data slice (e.g., EDS 1_1) of the set of encoded data slices when the first sub-set of encoded data slices includes one encoded data slice and the first encoded data slice is not received within a given time period, the first encoded slice (EDS 1_1) can be rebuilt. Rebuilding the first encoded data slice can be done by retrieving a decode threshold number of encoded data slices of the set of encoded data slices, dispersed storage error decoding the decode threshold number of encoded data slices to recapture a higher resolution data segment, dividing the higher resolution data segment into a plurality of data elements (as discussed in FIG. 10), matrix multiplying the data matrix with an encoding matrix to produce a coded matrix, and selecting a first row of the coded matrix as the rebuilt first encoded data slice. The computing device may then dispersed storage error decode the rebuilt first encoded data slice to recover the data segment at the first resolution.

Figure 10A:
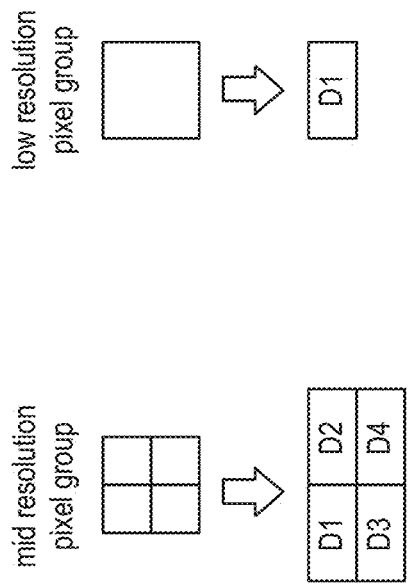
FIG. 10A is another example of dividing a data segment of a data object into data elements in accordance with the present invention.

FIG. 10A is an another example of dividing a data segment of a data object into data elements. This example shows the low resolution pixel group containing one pixel, and the mid-level resolution pixel group containing four pixels. Each pixel group is divided into data elements where each data element represents one pixel of the pixel group. For instance, the mid-level resolution pixel group is divided into data elements D1-D4. While the example depicts dividing a pixel groups of an image into data elements, a data segment of any data object (e.g., a video, audio, or digital image file) may be similarly divided into a plurality of data elements.

Figure 11A:
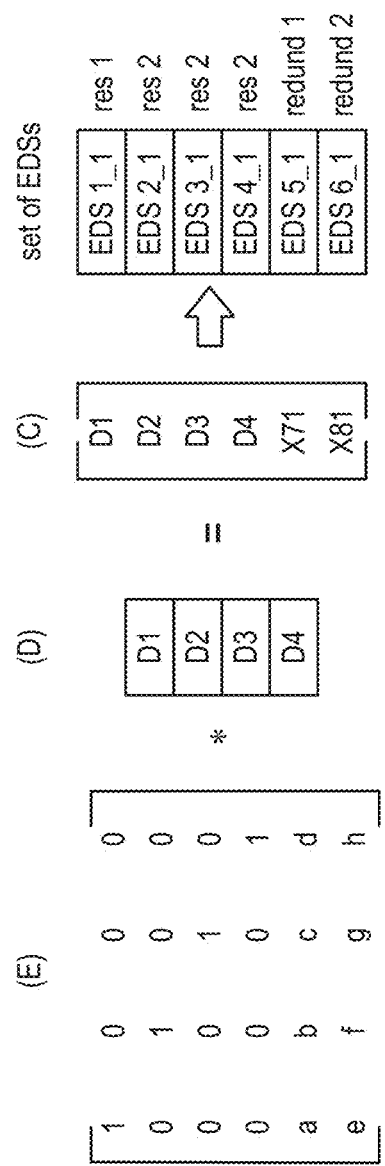
FIG. 11A is another example of dispersed error encoding a data object based on resolution in accordance with the present invention.

FIG. 11A is another example of dispersed error encoding a data object based on resolution. A data object (e.g., a video, audio, or digital image file) is divided into a plurality of data segments. For example, an image may be divided into pixel groups. The data segment is then divided into a plurality of data elements as discussed with reference to FIG. 10. As shown, the data elements may then be arranged into single column data matrix. Therefore, each row of the data matrix includes one data element of the data segment. In this example, the mid-level resolution pixel group containing four pixels is divided into data elements D1-D4. Each data element is arranged into a single column such that the data matrix contains one column and four rows. The first row of the data matrix includes data element D1 which is the low resolution pixel group containing one pixel (i.e., the first resolution). The second row of the data matrix includes data element D2, the third row of the data matrix includes data element D3, and the fourth row of the data matrix includes data element D4. Combining the first, second, third, and fourth rows of the data matrix corresponds to the mid-level resolution pixel group containing four pixels (i.e., the second resolution).

The data segment divided into data elements and organized into the data matrix is then dispersed error into a set of encoded data slices such that a first sub-set of encoded data slices of the set of encoded data slices corresponds to the first resolution of the data segment, a second sub-set of encoded data slices of the set of encoded data slices corresponds to the second resolution of the data segment, and the third sub-set of encoded data slices of the set of encoded data slices corresponds to redundancy encoded data slices. In addition, a fourth sub-set of encoded data slices of the set of encoded data slices corresponds to the third resolution of the data segment.

The data segment is dispersed error encoded by matrix multiplying the data matrix with an encoding matrix (matrix (E)) to produce a coded matrix (matrix (C)). The first sub-set of encoded data slices is selected from a first one or more rows of the coded matrix, and the second sub-set of encoded data slices is selected to include the first one or more rows of the coded matrix and a second one or more rows of the coded matrix. For example, EDS 1_1 is selected from the first row of the coded matrix containing data element D1 and corresponds to the first resolution of the data segment. EDS 2_1 is selected from the second row of the coded matrix containing data element D2, EDS 3_1 is selected from the third row of the coded matrix containing data element D3, and EDS 4_1 is selected from the fourth row of the coded matrix containing data element D4. EDS 1_1, EDS 2_1, EDS 3_1, and EDS 4_1 correspond to the second resolution of the data segment. EDS 5_1 and EDS 6_1 are selected from rows 5 and 6 of the coded matrix and correspond to redundancy data X71 and X81.

FIG. 12 is an example of creating a resolution-based data matrix. A data object 40 (e.g., a video, audio, or digital image file) is divided into a plurality of data segments 1-Y. For example, an image may be divided into sets of bits. A data segment of the plurality of data segments is then divided into data elements. For example, a mid-resolution pixel represented by 32 bits may be divided into four groups of 8-bit data elements. The first 8 bits corresponds to a low resolution pixel represented by 8 bits (i.e., a first resolution). Combining the first 8 bits with the second 8 bits, the third 8 bits, and the fourth 8 bits represents the mid-level resolution pixel represented by 32 bits (i.e., a second resolution). While this example depicts dividing the pixels of an image into data elements, any data segment of any data object (e.g., a video, audio, or digital image file) may be divided into a plurality of data elements. As an example, when the data object is a video file, a standard definition video file includes 480 lines per frame, while a high definition video file includes 720 or 1080 lines per frame. In one embodiment, a data segment may be divided into data elements where a first data element includes the 480 lines per frame and subsequent data elements include 720-480 or 1080-480 lines per frame, which are added to the 480 lines to produce the higher resolution video file. As a further example, audio files are sampled at a 44.1 KHz rate and multiples thereof or 48 KHz and multiples thereof. Lower sampling rates correspond to the first resolution and higher sampling rates correspond to the second resolution.

The data elements (i.e., groups of bits) are then arranged into a resolution-based data matrix (data matrix (D)). The data elements are arranged into the data matrix such that a first one or more rows of data elements corresponds to the data segment at the first resolution and the first one or more rows and a second one or more rows corresponds to the data segment at the second resolution. The first resolution includes a first fidelity level, and the second resolution includes a second fidelity level such that the second fidelity level is greater than the first fidelity level. For example, the first row of the data matrix contains the first 8 bits which correspond to the low resolution 8-bit representation of the pixel (i.e., the first resolution). The second row contains the second 8 bits, and the third row contains the third and fourth 8 bits. Combining the first, second, and third rows of the data matrix corresponds to the mid-level, 32-bit representation of the pixel (i.e., the second resolution).

FIG. 13 is another example of dispersed error encoding a data object based on resolution. The data segment divided into data elements and organized into the data matrix is dispersed error into a set of encoded data slices such that a first sub-set of encoded data slices of the set of encoded data slices corresponds to a first resolution of the data segment, a second sub-set of encoded data slices of the set of encoded data slices corresponds to a second resolution of the data segment, and a third sub-set of encoded data slices of the set of encoded data slices corresponds to redundancy encoded data slices. This is accomplished by matrix multiplying the data matrix with an encoding matrix (matrix (E)) to produce a coded matrix (matrix (C)). The first sub-set of encoded data slices is selected from a first one or more rows of the coded matrix, and the second sub-set of encoded data slices is selected to include the first one or more rows of the coded matrix and a second one or more rows of the coded matrix. In this example, EDS 1_1 is selected from the first row of the coded matrix containing the first 8 bits of the data segment. EDS 2_1 is selected from the second row of the coded matrix containing the second 8 bits of the data segment. EDS 3_1 is selected from the third row containing the third and fourth 8 bits of the data segment. EDS 4_1 is selected from row 4 of the coded matrix containing redundancy data X91-X92. EDS 5_1 is selected from row 5 of the coded matrix containing redundancy data X101-X-102. Therefore, a low resolution representation of the data segment may be obtained by retrieving EDS 1_1. If a computing device of the DSN requests retrieval of the data object at a higher resolution, more slices may be retrieved to enhance the image.

As another example, the data object 40 may be the result of a non-lossy transform such as a discrete cosine transform used as part of an image or audio file. The data object would be divided into a plurality of data segments and a data segment of the plurality of data segments would be divided into data elements in order from lower frequency to higher frequency. The data elements would be arranged in the data matrix such that obtaining a first encoded data slice would contain the lowest frequency information and would be a decent approximation of the original data on its own. Adding encoded data slices storing higher frequency oscillations would progressively improve the fidelity of the original data until the data is fully reconstructed.

In an example of a retrieval operation, when a computing device of the DSN determines the desired retrieval resolution of a data segment of data object is the first resolution, the computing device sends one or more first requests to one or more storage units of the DSN regarding the first sub-set of encoded data slices (e.g., EDS 1_1). Once the desired encoded data slices are retrieved, the computing device dispersed storage error decodes the first sub-set of encoded data slices to recover the data segment at the first resolution. For example, a low resolution representation of the data segment may be obtained by retrieving and decoding EDS 1_1. When the desired retrieval resolution is the second resolution, the computing device will send one or more second requests to storage units of the DSN regarding the second sub-set of encoded data slices (e.g., EDS 1_1, EDS 2_1, and EDS 3_1). The computing device will then dispersed storage error decode the second sub-set of encoded data slices to recover the data segment at the second resolution. Dispersed error encoding the data object produces redundant data (e.g., EDS 4_1 and EDS 5_1) so that desired encoded data slices may be reconstructed if lost or damaged. Rebuilding an encoded data slice is previously discussed in more detail with reference to FIG. 11.

Figure 13A:
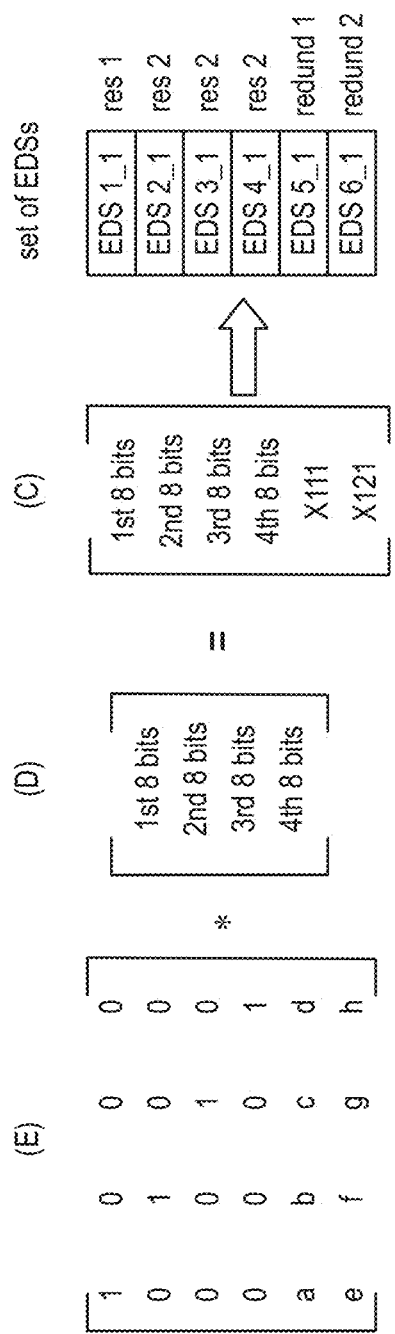
FIG. 13A is another example of dispersed error encoding a data object based on resolution in accordance with the present invention.

FIG. 13A is another example of dispersed error encoding a data object based on resolution. The data segment divided into data elements may then be arranged into single column data matrix. Therefore, each row of the data matrix includes one data element of the data segment. In this example, the mid-level resolution pixel group representing by 32 bits is divided into data elements where each data element represents 8 bits. Each data element is arranged into a single column such that the data matrix contains one column and four rows. The first row of the data matrix includes data element D1 which is the low resolution pixel group representing by 8 bits (i.e., the first resolution). The second row of the data matrix includes data element D2, the third row of the data matrix includes data element D3, and the fourth row of the data matrix includes data element D4. Combining the first, second, third, and fourth rows of the data matrix corresponds to the mid-level resolution pixel group represented by 32 pixels (i.e., the second resolution).

The single column data matrix is dispersed error into a set of encoded data slices such that a first sub-set of encoded data slices of the set of encoded data slices corresponds to a first resolution of the data segment, a second sub-set of encoded data slices of the set of encoded data slices corresponds to a second resolution of the data segment, and a third sub-set of encoded data slices of the set of encoded data slices corresponds to redundancy encoded data slices. This is accomplished by matrix multiplying the data matrix with an encoding matrix (matrix (E)) to produce a coded matrix (matrix (C)). The first sub-set of encoded data slices is selected from a first one or more rows of the coded matrix, and the second sub-set of encoded data slices is selected to include the first one or more rows of the coded matrix and a second one or more rows of the coded matrix. In this example, EDS 1_1 is selected from the first row of the coded matrix containing the first 8 bits of the data segment. EDS 2_1 is selected from the second row of the coded matrix containing the second 8 bits of the data segment. EDS 3_1 is selected from the third row containing the third 8 bits of the data segment. EDS 4_1 is selected from the fourth row containing the fourth 8 bits of the data segment. EDS 5_1 is selected from the fifth row of the coded matrix containing redundancy data X111. EDS 6_1 is selected from the sixth row of the coded matrix containing redundancy data X121. Therefore, a low resolution representation of the data segment may be obtained by retrieving EDS 1_1. If a computing device of the DSN requests retrieval of the data object at a higher resolution, more slices may be retrieved to enhance the image.

Figure 14:
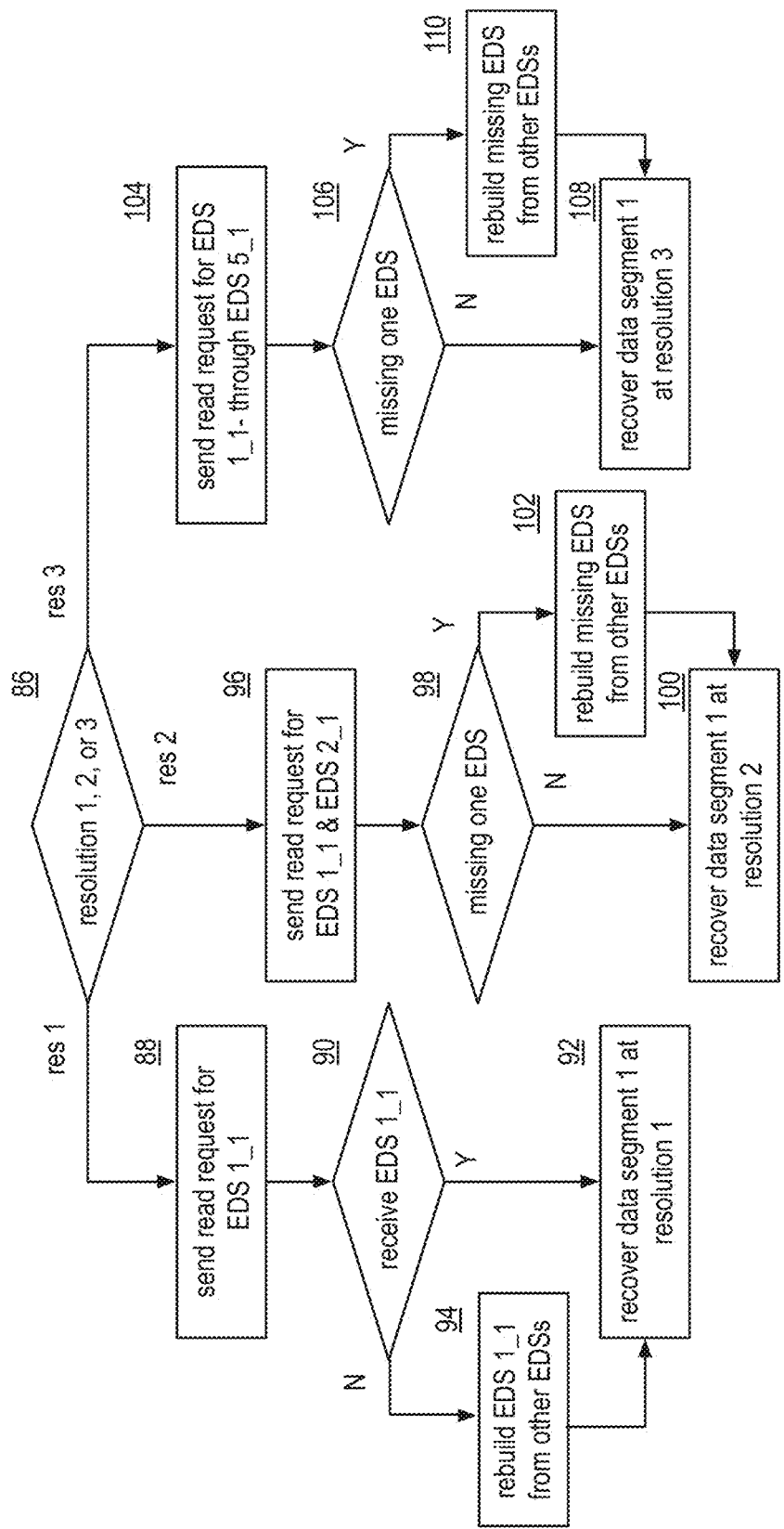
FIG. 14 is a logic diagram of an example of a method of retrieving a data object at a desired retrieval resolution in accordance with the present invention.

FIG. 14 is a logic diagram of an example of a method of retrieving a data object at a desired retrieval resolution. The method begins with step 86 where a computing device of the DSN determines a desired retrieval resolution (e.g., res 1, res 2, or res 3) of a data segment of a data object. The data object (e.g., a video, audio, or digital image file) is divided into a plurality of data segments, where the data segment is dispersed error encoded into a set of encoded data slices. A first sub-set of encoded data slices of the set of encoded data slices corresponds to a first resolution of the data segment, a second sub-set of encoded data slices of the set of encoded data slices corresponds to a second resolution of the data segment, and a third sub-set of encoded data slices of the set of encoded data slices corresponds to redundancy encoded data slices. The first resolution includes a first fidelity level, and the second resolution includes a second fidelity level, wherein the second fidelity level is greater than the first fidelity level.

As discussed previously with reference to FIGS. 10-11, the first resolution of the data segments may correspond to a first grouping of pixels, and the second resolution of the data segments corresponds to a second grouping of pixels that includes the first grouping of pixels and additional pixels. As another example, an image file may be stored as a bitmap. The bitmap image may be interlaced and divided into data elements representing pixels located at coordinates (a+4k, b+4j) where k and j are integers, a and b are numbers 1 through 3, and each data element has a unique a and b combination (if a threshold of 16 slices is selected in order to recover the full image). The data elements would be arranged in the data matrix such that retrieving a first encoded data slice stored based on this encoding scheme would yield a thumbnail 1/16 the size of the full image. As more encoded data slices are retrieved, more of the full image may be retrieved.

As discussed previously with reference to FIGS. 11A-13A, the first resolution of the data segments may correspond to a first number of bits, and the second resolution of the data segments corresponds to a second number of bits that includes the first number of bits and additional bits. While image files are primarily discussed for simplicity, any data segment of any data object (e.g., a video, audio, or digital image file) may be divided into a plurality of data elements. As an example, when the data object is a video file, a standard definition video file includes 480 lines per frame, while a high definition video file includes 720 or 1080 lines per frame. In one embodiment, a data segment may be divided into data elements where a first data element includes the 480 lines per frame and subsequent data elements include 720-480 or 1080-480 lines per frame, which are added to the 480 lines to produce the higher resolution video file. As a further example, audio files are sampled at a 44.1 KHz rate and multiples thereof or 48 KHz and multiples thereof. Lower sampling rates correspond to the first resolution and higher sampling rates correspond to the second resolution.

As another example, the data object may be the result of a non-lossy transform such as a discrete cosine transform used as part of an image or audio file. The data object would be divided into a plurality of data segments and a data segment of the plurality of data segments would be divided into data elements in order from lower frequency to higher frequency. The data elements would be arranged in the data matrix such that obtaining a first encoded data slice would contain the lowest frequency information and would be a decent approximation of the original data on its own. Adding encoded data slices storing higher frequency oscillations would progressively improve the fidelity of the original data until the data is fully reconstructed.

When the computing device determines that the desired retrieval resolution is the first resolution, the method continues to step 88 where the computing device sends one or more first requests to one or more storage units of the DSN regarding the first sub-set of encoded data slices. In this example, the first sub-set of encoded data slices includes one encoded data slice (e.g., EDS 1_1 of FIGS. 11 and 13). The method then continues to step 90, where the computing device determines if EDS 1_1 is received within a given time period. When EDS 1_1 is received within the given time period, the method continues to step 92 where the computing device dispersed storage error decodes EDS 1_1 to recover the data segment at the first resolution.

When EDS 1_1 is not received within the given time period, the method continues to step 94 where the computing device rebuilds EDS 1_1. Rebuilding EDS 1_1 can be done by retrieving a decode threshold number of encoded data slices of the set of encoded data slices, dispersed storage error decoding the decode threshold number of encoded data slices to recapture a higher resolution data segment, dividing the higher resolution data segment into a plurality of data elements (as discussed in FIG. 10), matrix multiplying the data matrix with an encoding matrix to produce a coded matrix, and selecting a first row of the coded matrix as the rebuilt EDS 1_1. The computing device may then dispersed storage error decode the rebuilt EDS 1_1 to recover the data segment at the first resolution.

When the computing device determines at step 86 that the desired retrieval resolution is the second resolution, the method continues to step 96 where the computing device sends one or more second requests to storage units of the DSN regarding the second sub-set of encoded data slices. This flowchart depicts the example of FIG. 11 where EDS 1_1 and EDS 2_1 are the second sub-set of encoded data slices. The method then continues to step 98, where the computing device determines if EDS 1_1 or EDS 2_1 are received within a given time period. When EDS 1_1 and EDS 2_1 are received within the given time period, the method continues to step 100 where the computing device dispersed storage error decodes EDS 1_1 and EDS 2_1 to recover the data segment at the second resolution.

When either EDS 1_1 or EDS 2_1 is not received within the given time period, the method continues to step 102 where the computing device rebuilds the missing or damaged encoded data slice from other encoded data slices. Rebuilding EDS 1_1 or EDS 2_1 can be done by retrieving a decode threshold number of encoded data slices of the set of encoded data slices, dispersed storage error decoding the decode threshold number of encoded data slices to recapture a higher resolution data segment, dividing the higher resolution data segment into a plurality of data elements, matrix multiplying the data matrix with an encoding matrix to produce a coded matrix, and selecting a first row or a second row of the coded matrix as the rebuilt EDS 1_1 or EDS 2_1. The computing device may then dispersed storage error decode second sub-set of encoded data slices to recover the data segment at the second resolution.

When the computing device determines at step 86 that the desired retrieval resolution is the third resolution, the method continues to step 104 where the computing device sends one or more third requests to storage units of the DSN regarding a fourth sub-set of encoded data slices. This flowchart depicts the example of FIG. 11 where EDS 1_1 through EDS 5_1 are the fourth sub-set of encoded data slices corresponding to the third resolution. The method then continues to step 106, where the computing device determines if EDS 1_1 through EDS 5_1 are received within a given time period. When EDS 1_1 through EDS 5_1 are received within the given time period, the method continues to step 108 where the computing device dispersed storage error decodes EDS 1_1 through EDS 5_1 to recover the data segment at the third resolution.

When any of the slices EDS 1_1 through EDS 5_1 are not received within the given time period, the method continues to step 110 where the computing device rebuilds the missing or damaged encoded data slice from other encoded data slices. Rebuilding the lost or damaged encoded data slice can be done by retrieving a decode threshold number of encoded data slices of the set of encoded data slices, dispersed storage error decoding the decode threshold number of encoded data slices to recapture a higher resolution data segment, dividing the higher resolution data segment into a plurality of data elements, matrix multiplying the data matrix with an encoding matrix to produce a coded matrix, and selecting necessary row of the coded matrix as the rebuilt encoded data slice. The computing device may then dispersed storage error decode the third sub-set of encoded data slices to recover the data segment at the third resolution.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed storage network (DSN), the method comprises:
   determining a desired retrieval resolution of a data segment of a data object, wherein the data object is divided into a plurality of data segments, wherein the data segment is dispersed error encoded into a set of encoded data slices in accordance with a varying resolution scheme, wherein a first sub-set of encoded data slices of the set of encoded data slices corresponds to a first resolution of the data segment, a second sub-set of encoded data slices of the set of encoded data slices corresponds to a second resolution of the data segment, and a third sub-set of encoded data slices of the set of encoded data slices corresponds to redundancy encoded data slices;
   when the desired retrieval resolution is the first resolution:
      sending one or more first requests to one or more storage units of the DSN regarding the first sub-set of encoded data slices; and
      dispersed storage error decoding the first sub-set of encoded data slices to recover the data segment at the first resolution; and
   when the desired retrieval resolution is the second resolution:
      sending one or more second requests to storage units of the DSN regarding the second sub-set of encoded data slices; and
      dispersed storage error decoding the second sub-set of encoded data slices to recover the data segment at the second resolution.

2. The method of claim 1 further comprises:
   when the desired retrieval resolution is a third resolution, wherein a fourth sub-set of encoded data slices of the set of encoded data slices corresponds to the third resolution of the data segment:
      sending third requests to the storage units of the DSN regarding the fourth sub-set of encoded data slices; and
      dispersed storage error decoding the fourth sub-set of encoded data slices to recover the data segment at the third resolution.

3. The method of claim 1, wherein the dispersed error encoding the data segment in accordance with the varying resolution scheme comprises:
   dividing the data segment into a plurality of data elements;
   arranging the data elements into a data matrix, wherein a first one or more rows of data elements corresponds to the data segment at the first resolution and the first one or more rows and a second one or more rows corresponds to the data segment at the second resolution;
   matrix multiplying the data matrix with an encoding matrix to produce a coded matrix;
   selecting the first sub-set of encoded data slices from a first one or more rows of the coded matrix; and
   selecting the second sub-set of encoded data slices to include the first one or more rows of the coded matrix and a second one or more rows of the coded matrix.

4. The method of claim 1 further comprises:
   sending a read request to a storage unit of the one or more storage units for a first encoded data slice of the set of encoded data slices when the first sub-set of encoded data slices includes one encoded data slice;
   when the first encoded data slice is not received within a given time period, rebuilding the first encoded data slice by:
      retrieving a decode threshold number of encoded data slices of the set of encoded data slices;
      dispersed storage error decoding the decode threshold number of encoded data slices to recapture a higher resolution data segment;
      dividing the higher resolution data segment into a plurality of data elements, wherein a first row of data elements corresponds to the data segment at the first resolution and other rows correspond to one or more higher resolutions of the data segment;
      matrix multiplying the data matrix with an encoding matrix to produce a coded matrix;
      selecting a first row of the coded matrix as the rebuilt first encoded data slice; and
      dispersed storage error decoding the rebuilt first encoded data slice to recover the data segment at the first resolution.

5. The method of claim 1 further comprises:
   the first resolution includes a first fidelity level; and the second resolution includes a second fidelity level, wherein the second fidelity level is greater than the first fidelity level.

6. The method of claim 1, wherein the data object comprises one or more of:
a video file;
an audio file; and
a digital image file.

7. The method of claim 1 further comprises:
the first resolution of the data segments corresponds to a first number of bits; and
the second resolution of the data segments corresponds to a second number of bits that includes the first number of bits and additional bits.

8. The method of claim 1 further comprises:
the first resolution of the data segments corresponds to a first grouping of pixels; and
the second resolution of the data segments corresponds to a second grouping of pixels that includes the first grouping of pixels and additional pixels.

9. A computing device of a dispersed storage network (DSN), the computing device comprises:
an interface;
memory; and
a processing module operably coupled to the memory and the interface, wherein the processing module is operable to:
determine a desired retrieval resolution of a data segment of a data object, wherein the data object is divided into a plurality of data segments, wherein the data segment is dispersed error encoded into a set of encoded data slices in accordance with a varying resolution scheme, wherein a first sub-set of encoded data slices of the set of encoded data slices corresponds to a first resolution of the data segment, a second sub-set of encoded data slices of the set of encoded data slices corresponds to a second resolution of the data segment, and a third sub-set of encoded data slices of the set of encoded data slices corresponds to redundancy encoded data slices;
when the desired retrieval resolution is the first resolution:
send one or more first requests to one or more storage units of the DSN regarding the first sub-set of encoded data slices; and
dispersed storage error decode the first sub-set of encoded data slices to recover the data segment at the first resolution; and
when the desired retrieval resolution is the second resolution:
send one or more second requests to storage units of the DSN regarding the second sub-set of encoded data slices; and
dispersed storage error decode the second sub-set of encoded data slices to recover the data segment at the second resolution.

10. The computing device of claim 9, wherein the processing module further functions to:
when the desired retrieval resolution is a third resolution, wherein a fourth sub-set of encoded data slices of the set of encoded data slices corresponds to the third resolution of the data segment:
send third requests to the storage units of the DSN regarding the fourth sub-set of encoded data slices; and
dispersed storage error decode the fourth sub-set of encoded data slices to recover the data segment at the third resolution.

11. The computing device of claim 9, wherein the processing module dispersed error encodes the data segment in accordance with the varying resolution scheme by:
dividing the data segment into a plurality of data elements;
arranging the data elements into a data matrix, wherein a first one or more rows of data elements corresponds to the data segment at the first resolution and the first one or more rows and a second one or more rows corresponds to the data segment at the second resolution;
matrix multiplying the data matrix with an encoding matrix to produce a coded matrix;
selecting the first sub-set of encoded data slices from a first one or more rows of the coded matrix; and
selecting the second sub-set of encoded data slices to include the first one or more rows of the coded matrix and a second one or more rows of the coded matrix.

12. The computing device of claim 9, wherein the processing module further functions to:
send a read request to a storage unit of the one or more storage units for a first encoded data slice of the set of encoded data slices when the first sub-set of encoded data slices includes one encoded data slice;
when the first encoded data slice is not received within a given time period, rebuild the first encoded data slice by:
retrieving a decode threshold number of encoded data slices of the set of encoded data slices;
dispersed storage error decoding the decode threshold number of encoded data slices to recapture a higher resolution data segment;
dividing the higher resolution data segment into a plurality of data elements, wherein a first row of data elements corresponds to the data segment at the first resolution and other rows correspond to one or more higher resolutions of the data segment;
matrix multiplying the data matrix with an encoding matrix to produce a coded matrix;
selecting a first row of the coded matrix as the rebuilt first encoded data slice; and
dispersed storage error decoding the rebuilt first encoded data slice to recover the data segment at the first resolution.

13. The computing device of claim 9 further comprises:
the first resolution includes a first fidelity level; and
the second resolution includes a second fidelity level, wherein the second fidelity level is greater than the first fidelity level.

14. The computing device of claim 9, wherein the data object comprises one or more of:
a video file;
an audio file; and
a digital image file.

15. The computing device of claim 9 further comprises:
the first resolution of the data segments corresponds to a first number of bits; and
the second resolution of the data segments corresponds to a second number of bits that includes the first number of bits and additional bits.

16. The computing device of claim 9 further comprises:
the first resolution of the data segments corresponds to a first grouping of pixels; and the second resolution of the data segments corresponds to a second grouping of pixels that includes the first grouping of pixels and additional pixels.

* * * * *